US012791503B2

(12) United States Patent
Fujiwara et al.

(10) Patent No.: US 12,791,503 B2
(45) Date of Patent: Nov. 10, 2026

(54) POLARIZATION IMAGE ACQUISITION APPARATUS AND THERMAL ANALYZER

(71) Applicant: HITACHI HIGH-TECH ANALYSIS CORPORATION, Tokyo (JP)

(72) Inventors: Hirohito Fujiwara, Tokyo (JP); Ryokuhei Yamazaki, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 374 days.

(21) Appl. No.: 18/370,244

(22) Filed: Sep. 19, 2023

(65) Prior Publication Data

US 2024/0125724 A1 Apr. 18, 2024

(30) Foreign Application Priority Data

Oct. 1, 2022 (JP) ................................ 2022-159164

(51) Int. Cl.

*G01N 25/48* (2006.01)
*G02B 21/00* (2006.01)
*G02B 21/36* (2006.01)

(52) U.S. Cl.

CPC ..... *G01N 25/4866* (2013.01); *G02B 21/0092* (2013.01); *G02B 21/361* (2013.01)

(58) Field of Classification Search

CPC .... G01N 1/44; G01N 25/488; G01N 25/4866; G01N 21/21; G01N 25/20; G01N 21/01; G01N 21/361; G01N 21/092

See application file for complete search history.

(56) References Cited

U.S. PATENT DOCUMENTS

2015/0153292 A1* 6/2015 Nishimura ............... G01N 5/00 374/12
2023/0296497 A1* 9/2023 Fujiwara .................. G01N 1/44 356/364

FOREIGN PATENT DOCUMENTS

EP 1715322 A2 * 10/2006 ............ B82Y 35/00
JP H8-327573 A 12/1996
JP 5792660 A 9/2013
JP 6061836 A 6/2015
KR 101428991 B1 * 8/2014

OTHER PUBLICATIONS

Computer translation of KR_101428991_B1 (Year: 2025).*

* cited by examiner

*Primary Examiner* — Randy W Gibson
(74) *Attorney, Agent, or Firm* — Holland & Hart LLP

(57) ABSTRACT

The apparatus is attached to a thermal analyzer including a pair of sample containers and a heating furnace having a window or an opening through which at least the measurement sample can be observed, and includes an attachment unit, a light source, a polarizer constituting a polarizing filter that polarizes irradiation light emitted from the light source, a camera, a half mirror, a rotation mechanism and an analyzer constituting a polarizing filter configured to polarize reflected light through the half mirror and to introduce the resulting polarized light of the reflected light into the camera, in which the polarized light irradiates the sample after passing through the window or opening and then reflects from the sample wherein the analyzer, the half mirror, and the light source are fixed to a fixing member and the rotation mechanism rotates the fixing member in a polarization direction of the analyzer.

8 Claims, 11 Drawing Sheets

POLARIZATION IMAGE ACQUISITION APPARATUS AND THERMAL ANALYZER

CROSS REFERENCE TO RELATED APPLICATION

The present application claims priority to Japanese Patent Application No. 2022-159164, filed Oct. 1, 2022, the entire contents of which is incorporated herein for all purposes by this reference.

BACKGROUND OF THE INVENTION

1. Field of the Invention

The present invention relates to a polarization image acquisition apparatus attached to a thermal analyzer that measures thermal behaviors of a sample to obtain a polarization image of the sample and to a thermal analyzer.

2. Description of the Related Art

Conventionally, as a method of evaluating the temperature characteristics of a sample, a method called thermal analysis is used in which the sample is heated, and temperature-dependent changes in physical properties of the sample are measured. Thermal analysis is defined in JIS 0129:2005 standard "General Rules for Thermal Analysis", and all methods of measuring the physical properties of a measurement object (measurement sample) while controlling the temperature of the measurement sample in a programmed manner are called thermal analysis. There are five commonly used thermal analysis methods: (1) differential thermal analysis (DTA) of detecting temperature (temperature difference); (2) differential scanning calorimetry (DSC) of detecting thermal flow difference; (3) thermal gravimetry (TG) of detecting mass (weight change); (4) thermomechanical analysis (TMA) of detecting mechanical properties; and (5) dynamic viscoelasticity measurement (DMA).

In addition, in recent years, there has been a demand for observing the states of a sample during thermal analysis, and there is known a thermal analyzer in which a sample cover or a heating furnace is provided with a widow or opening, and the sample is observed through the window or opening (for example, Patent Documents 1 to 3).

The thermal analyzer disclosed in Patent Document 1 is a heat flux-type differential scanning calorimeter (DSC). A holder of a measurement sample and a holder of a reference material are installed on a heat sink via respective thermal resistors, and the temperature difference between to the measurement sample and the reference material is measured as a function of temperature. Heat flow occurs between the heat sink and each of the holders via the thermal resistors, and the heat flow difference is proportional to the temperature difference described above. The temperature difference is then detected with a thermocouple or the like and is output as a DSC signal.

This differential scanning calorimeter is a type in which a window made of a transparent material is provided in a local area of the cover covering the opening of the heating furnace.

The thermal analyzers disclosed in Patent Documents 2 and 3 are types in which a pair of sample holders are provided in a furnace tube made of a transparent material, and an opening is provided at a position of the furnace tube at which the heating furnace moved forward is exposed, or types in which the furnace itself is provided with an opening.

DOCUMENT OF RELATED ART

Patent Document

[Patent Document 1] Japanese Patent Application Publication No. H8-327573

[Patent Document 2] Japanese Patent No. 5792660

[Patent Document 3] Japanese Patent No. 6061836

SUMMARY OF THE INVENTION

There are cases where it is preferable to obtain a polarization image through a window or opening as described above when observing and imaging a sample during thermal analysis. A so-called polarizing microscope is known as a means for observing such a polarization image. As an observation method using a polarizing microscope, crossed Nicols are used in which a polarizer linearly polarizes light emitted from a light source so that the linearly polarized light irradiates a sample, and the reflected light from the sample is observed with an analyzer.

When using a polarizing microscope, the rotation position of the polarizer is adjusted to a predetermined position, and the sample is observed while a sample stage is rotated, thereby obtaining polarization images. Note that the thermal analyzer is of an insertion-and-retraction type and thus cannot be rotated.

However, when the polarization image of the sample of the thermal analyzer is observed, it is extremely difficult to rotate the sample and the sample holder, in principle and due to the limitations of the apparatus, and it is impossible to observe the polarization image of the sample using the polarizing microscope as it is.

The present invention has been made to solve the above-described problems and is intended to provide a polarization image acquisition apparatus and a thermal analyzer capable of obtaining a polarization image of a measurement sample or a reference sample placed in the thermal analyzer.

In order to achieve the objectives of the present invention, there is provided an polarization image acquisition apparatus attached to a thermal analyzer including a pair of sample containers respectively containing a measurement sample and a reference sample, and a heating furnace surrounding the sample containers from the outside, the heating furnace having a window or an opening through which at least the measurement sample is observable, in which the polarization image acquisition apparatus includes an attachment unit attached to the thermal analyzer, a light source, a polarizer constituting a polarizing filter that polarizes irradiation light emitted from the light source, a camera, a half mirror, and an analyzer constituting a polarizing filter and being configured such that polarized light transmitted through the polarizer irradiates the measurement sample or the reference sample through the window or opening via the half mirror, and the reflected light is polarized through the half mirror and is introduced into the camera. In addition, the polarizer, the analyzer, the half mirror, and the light source are fixed to a fixing member to constitute an optical unit, and the apparatus further includes a rotation mechanism that rotates the fixing member in a polarization direction of the analyzer.

In the case of the polarization image acquisition apparatus, since a first optical path of the polarizer and a second optical path of the analyzer are not parallel via the half mirror, in a state in which the polarization image acquisition apparatus including the polarizer and the analyzer is arranged outside the window or opening of the thermal analyzer, a sample state inside the window or opening can be imaged with the camera. On the other hand, when the first optical path and the second optical path are parallel, a sample state inside the window or opening cannot be observed in a state in which the apparatus is disposed outside the window or opening of the thermal analyzer.

In addition, since the analyzer can be rotated by rotating the fixing member, even though it is difficult in principle to rotate the sample (sample holder) of the thermal analyzer, when the analyzer is appropriately rotated, a polarization image of the measurement sample or the reference sample in the thermal analyzer can be obtained through the window or an opening.

In addition, by rotating and polarizing only the analyzer and not changing the relative positions of the polarizer, the half mirror, and the light source (which rotate like a single unit because the relative positions thereof are maintained on the fixed member), fluctuations in light amount of an observation image are suppressed.

This is because when the polarizer is rotated to polarize the incident light (the polarization direction is changed), and the light is introduced into the half mirror, the transmittance through the half mirror changes depending on the polarization direction of the light introduced into the half mirror. Therefore, when the transmittance/reflectance fluctuates depending on the polarization direction of the incident light, the amount of light in polarization images obtained by the camera will eventually change.

In the polarization image acquisition apparatus of the present invention, the half mirror may be a cube-type beam splitter.

When a plate-type beam splitter is used as the half mirror, the transmitted light is refracted due to the thickness, and the optical path (position) is shifted. Accordingly, as the plate-type beam splitter rotates along with the rotation of the fixing member, an observation image M1 eccentrically moves in a fashion like drawing a circle, which obstructs observation.

In the case of using a cube-type beam splitter, which is a structure in which an optical thin film is deposited on a sloped surface of one of two prisms, and the two prisms are combined, the thickness of the thin film acting as a beam splitter is extremely thin, thereby preventing refraction of transmitted light which occurs in the above-mentioned plate-type beam splitter, and the shift of the optical path (position) can be almost eliminated. As a result, when the polarizer is rotated for polarization, it is possible to inhibit the observation image from eccentrically moving, thereby facilitating observation.

In the polarization image acquisition apparatus of the present invention, the fixing member may have an adjusting member that adjusts at least the optical axis of the half mirror.

The polarization image acquisition apparatus can correct the shift (tilt) of the optical axis of the analyzer when the fixing member is rotated and can prevent the eccentric movement attributable to the tilt of the optical axis.

Aside from the half mirror, the optical axes (tilts) of the analyzer and the fixing member for mounting the analyzer may be adjusted.

In the polarization image acquisition apparatus of the present invention, the polarizer and the analyzer may be rotatable relative to each other.

In the polarization image acquisition apparatus, the relative angle of the plane directions of the polarizer and the analyzer can be adjusted, and the degree of polarization effect can be adjusted. The thermal analyzer according to the present invention may include the polarization image acquisition apparatus.

According to the present invention, it is possible to obtain a polarization image of a measurement sample or a reference sample placed in a thermal analyzer.

DESCRIPTION OF THE PREFERRED EMBODIMENTS

Hereinafter, embodiments of the present invention will be described with reference to the accompanying drawings.

Figure 3:
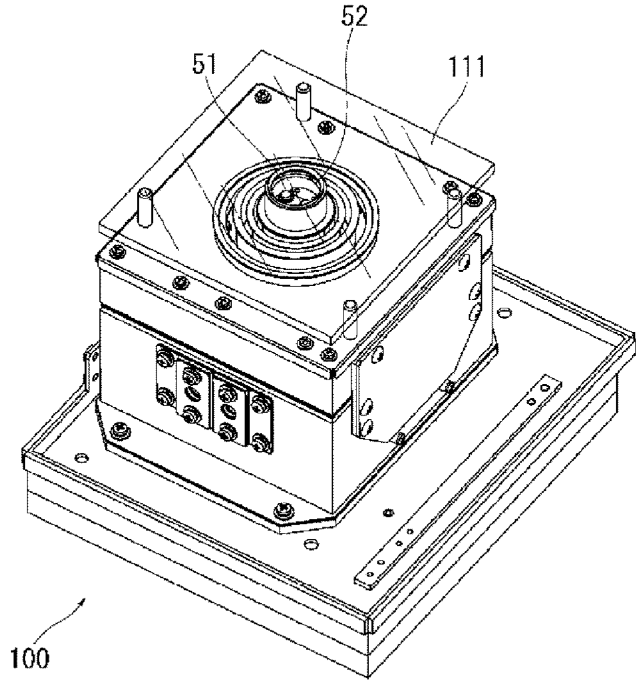
FIG. 3 is a perspective view illustrating a differential scanning calorimeter (DSC), which is a thermal analyzer to which the polarization image acquisition apparatus according to one embodiment of the present invention is attached.

First, a differential scanning calorimeter (DSC), which is a thermal analyzer 100, will be described with reference to FIGS. 3 and 4.

The thermal analyzer 100 has the same configuration as a conventional differential scanning calorimeter, except that the entire area of an upper lid 111 of a heating furnace 101 is provided as a window.

Specifically, the thermal analyzer 100 includes sample containers 51 and 52 disposed in the heating furnace 101 to accommodate a measurement sample $S_1$ and a reference sample $S_2$, respectively, thermal resistors 114 connected between the sample containers 51 and 52 and the heating furnace 101 to form thermal flow paths, a measurement sample-side thermocouple 107, and a reference sample-side thermocouple 108.

A coil heater 103 is wound around the outer surface of the heating furnace 101 to heat the heating furnace 101.

The heating furnace 101 is formed in a cylindrical shape and has an H-shaped cross section when it is taken along an axial direction. A heat plate 105 having a substantially double disk shape is disposed above an annular protrusion protruding radially inward from the center in the axial direction.

In addition, the sample containers 51 and 52 are provided on the upper surface of the heat plate 105 via the respective thermal resistors 114.

In addition, the lid 111 is detachably attached to the heating furnace to cover an opening formed at an upper end of the heating furnace 101, thereby shielding the inside of the heating furnace 101 from external air.

In addition, since the entire area of the upper lid 111 is a transparent member made of quartz glass, the upper lid 111 itself forms a window through which the sample containers 51 and 52 and the measurement and reference samples $S_1$ and $S_2$ in the heating furnace 101 can be observed.

The respective leading ends of the measurement sample-side thermocouple 107 and the reference sample-side thermocouple 108 are installed to pass through the thermal resistors 114 and the heat plate 105 and are connected to the lower surfaces of the sample containers 51 and 52 by brazing. On the other hand, the respective remaining ends of the measurement sample-side thermocouple 107 and the reference sample-side thermocouple 108 extend to below the heating furnace 101 and are connected to an amplifier 124*c* constituting a signal processing circuit.

In this way, the measurement sample-side thermocouple 107 and the reference sample-side thermocouple 108 constitute a so-called differential thermocouple and detect the temperature difference between the measurement sample $S_1$ and the reference sample $S_2$. This temperature difference is recorded as a heat flow difference signal. On the other hand, the temperature of the measurement sample, which is output from the measurement sample-side thermocouple 107, is recorded.

Figure 1:
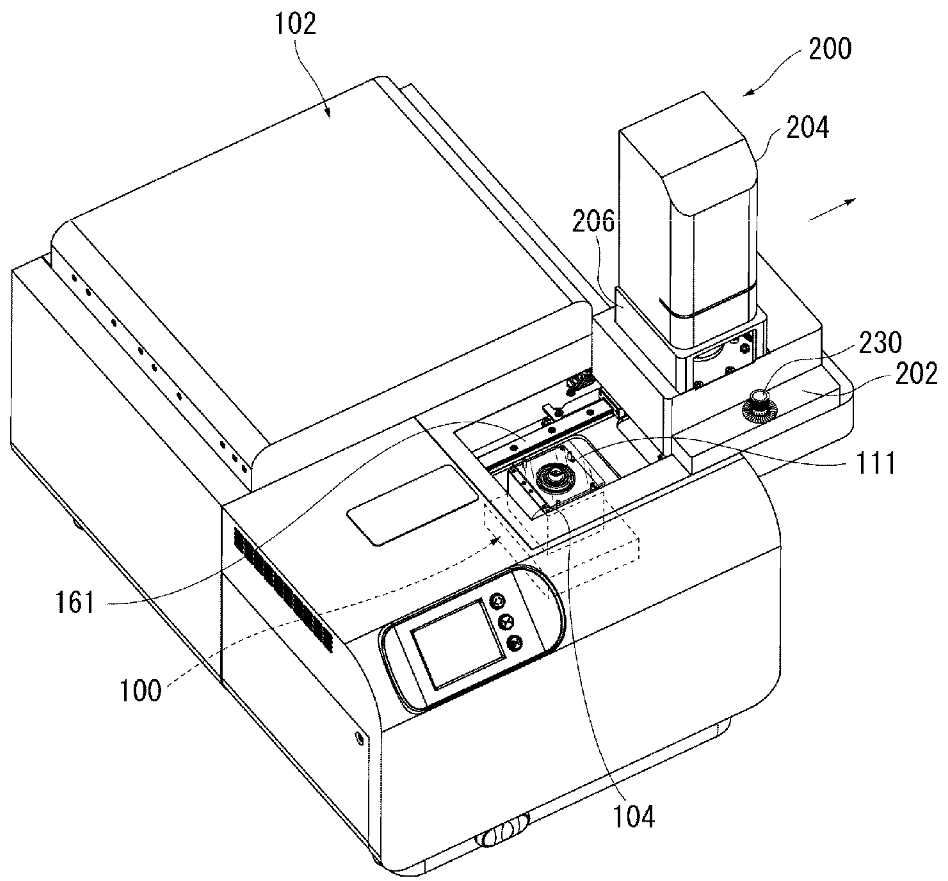
FIG. 1 is a perspective view illustrating the construction of a thermal analyzer mounted with a polarization image acquisition apparatus according to one embodiment of the present invention.

As illustrated in FIG. 1, the entire thermal analyzer 100 is disposed in a casing 102. In addition, the casing 102 has a rectangular casing opening 104 at a position directly above the window (upper lid) 111, and rails 161 for installing and moving the polarization image acquisition apparatus 200 are mounted on two sides (left and right sides of FIG. 1) of the casing opening 104.

Next, the polarization image acquisition apparatus 200 according to one embodiment of the present invention will be described with reference to FIGS. 2 and 4.

Figure 2:
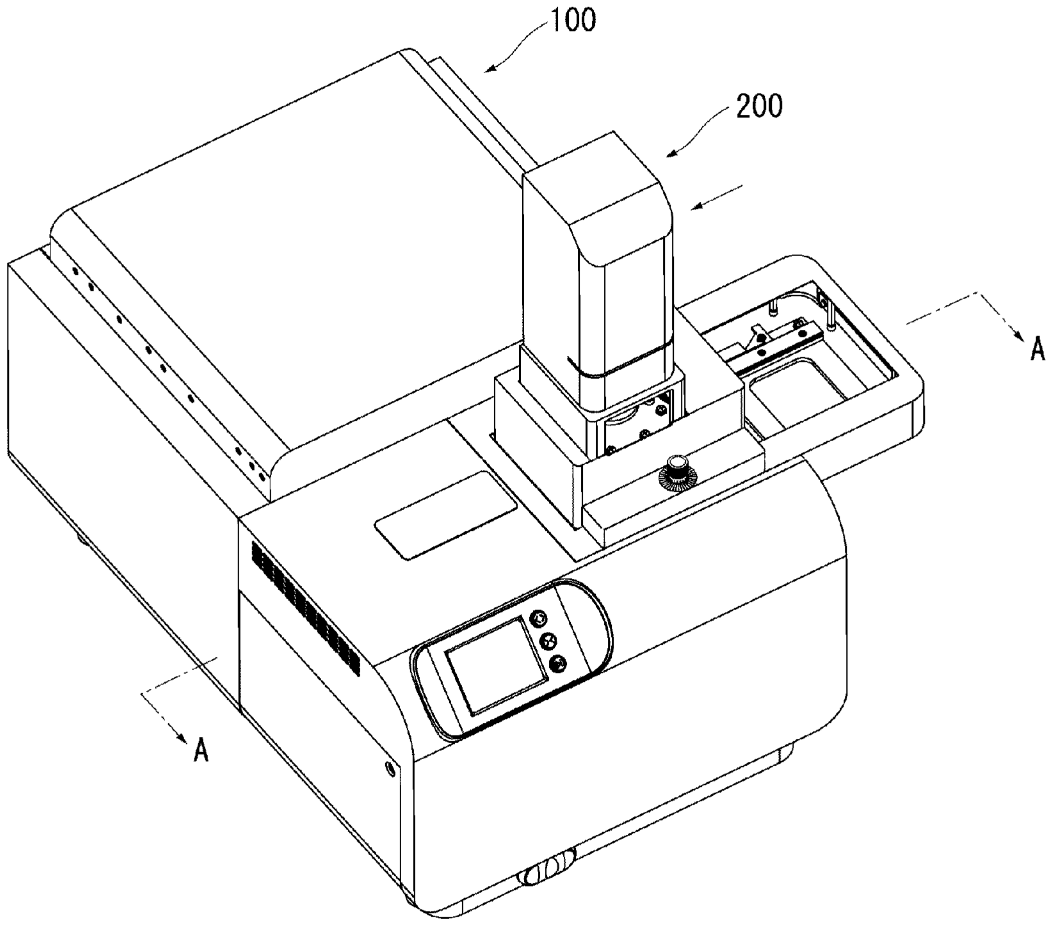
FIG. 2 is a perspective view illustrating the polarization image acquisition apparatus of FIG. 1 positioned at a measurement position.

As illustrated in FIG. 2, the polarization image acquisition apparatus 200 includes an attachment unit 202 attached to the thermal analyzer 100, covers 204 and 206, and a turning knob 230 to be described later. The attachment unit 202 has a rectangular box shape as a whole. As illustrated in FIG. 4, a block 162 constituting a linear guide 160 in conjunction with the rails 161 is disposed on the rear surface of the attachment unit 202. Accordingly, the polarization image acquisition apparatus 200 can be moved forward and backward along with the movement of the block 162 along the rails 161 of the thermal analyzer 100.

Note that the linear guide 160 is an existing linear guide that is known, and the rolling bearing provided in the block 162 easily moves relative to the rails 161. Examples of the linear guide 160 include an LM guide (registered trademark). In addition, the mechanism for moving the polarization image acquisition apparatus 200 forwards and backwards is not limited to the linear guide, and various known types of actuators can be used.

At a retraction position illustrated in FIG. 1, the polarization image acquisition apparatus 200 is maximally spaced apart from the thermal analyzer 100, and the casing opening 104 and the upper lid (window) 111 of the thermal analyzer 100 disposed inside the casing opening 104 are exposed.

On the other hand, at a measurement position illustrated in FIG. 2, the polarization image obtainment apparatus 200 is positioned close to the thermal analyzer 100, and the polarization image acquisition apparatus 200 is disposed directly above the upper lid (window) 111.

Figure 4:
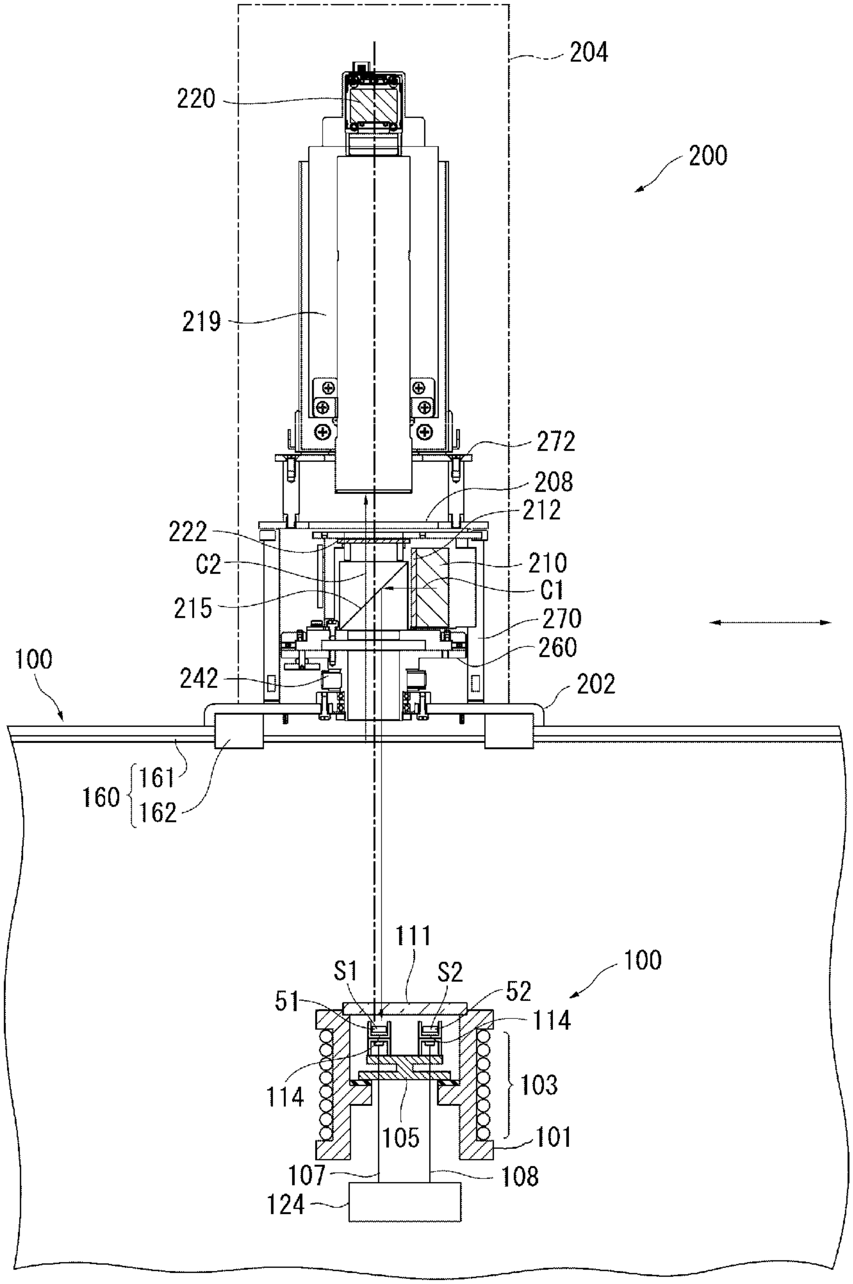
FIG. 4 is a cross-sectional view taken along A-A line of FIG. 2.

As illustrated in FIG. 4, the polarization image acquisition apparatus 200 further includes a light source 210 such as an LED, a polarizer 212 constituting a polarizing filter that polarizes irradiation light emitted from the light source 210, a half mirror (cube-type beam splitter) 215, a camera 220 such as a CCD camera, and an analyzer 222 constituting a polarizing filter configured such that when polarized light transmitted through the polarizer 212 irradiates the measurement sample $_{S1}$ or the reference sample S2 via the upper lid (window) 111, and the reflected light is polarized through the half mirror 215 and is then introduced into the camera 222.

In addition, a pulley 242 is disposed on the upper surface of the attachment unit 202, and a fixing member 260 is attached to the upper surface of the pulley 242.

The camera 220 is mounted perpendicularly on a base 208 to cover the analyzer 222 from the top. Note that a lens group 219 is disposed between the camera 220 and the analyzer 222, and the polarized light emitted upward from the analyzer 222 is properly focused by the lens group 219 and converges to the camera 220.

In addition, four struts 270 are attached to the upper surface of the attachment unit 202 to enclose the fixing member 260, and the base 208 is fixed on the struts 270. In addition, four struts 272 are attached to the upper surface of the base 208, and the lens group 219 and the camera 220 are fixed on the struts 272.

Figure 5:
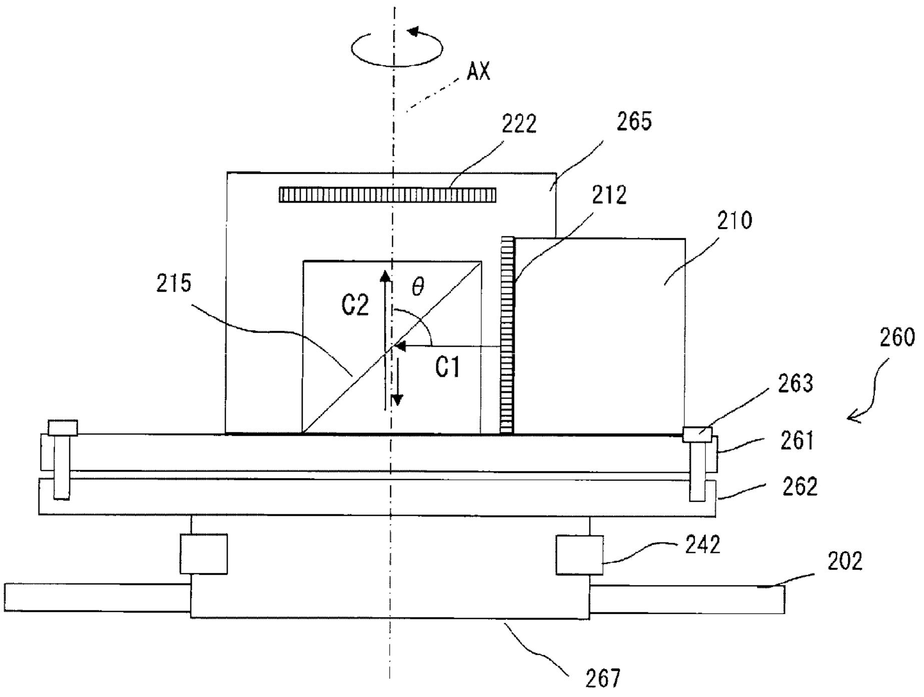
FIG. 5 is a front view illustrating an optical unit in the polarization image acquisition apparatus.

As shown in FIG. 5, the polarizer 212, the analyzer 222, the half mirror 215, and the light source 210 are fixed on the fixing member 260, thereby constituting an optical unit in which the relative positions there among are maintained.

Note that the expression "the relative positions are maintained" means that the physical position of the optical unit described above does not change. Even the case the polarizer 212 and the analyzer 222 are rotated in the plane direction to change the polarization state falls within the meaning of the expression "relative positions are maintained".

Although the relative positions of the polarizer 212 and the analyzer 222 are maintained, the relative angle of the analyzer and the polarizer can be adjusted. The rotation of the polarizer 212 and the analyzer 222 will be described later.

The fixing member 260 includes two rotary panels 261 and 262, adjustment screws 263, a fixed panel 265, and a rotary shaft 267.

The two rotary panels 261 and 262 are arranged coaxially with the axial center AX, and the rotary panels 261 are arranged on the upper surface side. The multiple adjustment screws 263 are screwed in parallel with the axial direction of the rotary panels 261 and 262 and are positioned along the circumferential edges of the rotary panels 261 and 262. On the other hand, the rotary shaft 267 is mounted coaxially with the axial center AX below the rotary panel 262, and the pulley 242 is disposed along the outer edge of the rotary shaft 267.

Then, with the adjustment of the tightening depth of the adjustment screws 263, the rotary panel 261 is tilted, in the plane direction, relative to the rotary panel 262, and the tilt (shift) of the rotary panel 261 relative to the rotary shaft 267 can be corrected. Thus, at least the shift in the optical axis of the half mirror 215 when the fixing member 260 is rotated can be corrected. The adjustment screw 263 corresponds to the "adjustment member" recited in the claims.

Through this operation, the shift (tilt) of the optical axis of the analyzer when the fixing member is rotated can be corrected. In addition, the eccentric movement caused due to the tilt of the optical axis can be prevented.

The light source 210 is fixed to the right upper surface of the rotary panel 261 and laterally emits light. In addition, the polarizer 212 is attached to the upper surface of the rotary panel 261 on the irradiation side of the light source 210. The half mirror 215 is attached to the upper surface of the rotary panel 261, and irradiates the measurement sample $S_1$ or the reference sample $S_2$ with the polarized light by transmitting the polarized light coming from the polarizer 212 in a downward direction.

The fixed panel 265 is installed on the upper surface of the rotary panel 261, and the analyzer 222 is attached to the fixed panel 265 and is thus disposed above the half mirror 215. The optical axis of the analyzer 222 is arranged to be aligned with the axial center AX of the fixing member 260.

Figure 13:
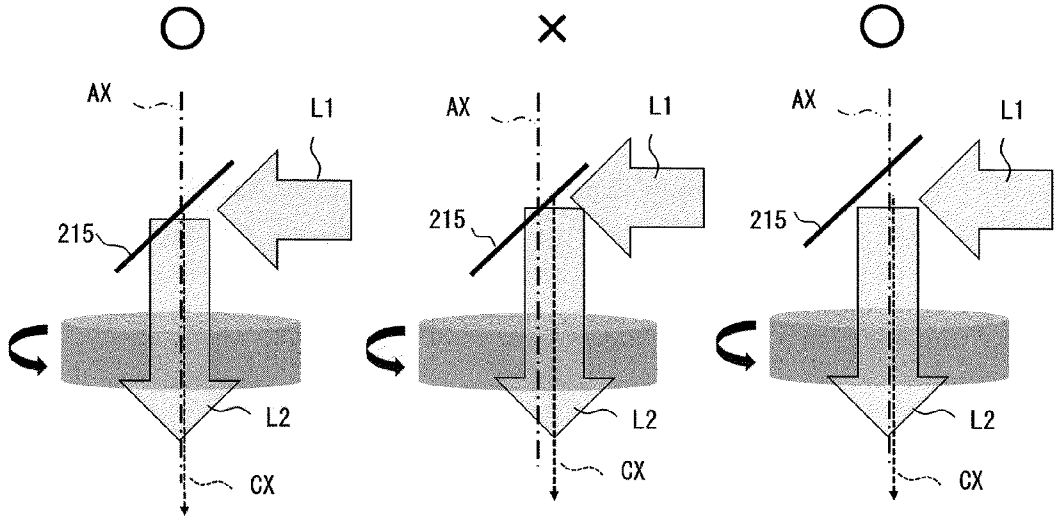
FIG. 13 is a schematic diagram illustrating a method of determining the relative positions of the half mirror and the light source.

As shown in FIG. 13, it is necessary to determine the relative positions of the half mirror 215 on the rotary panel 261 and the light source 210 so that the optical center CX of the reflected light L2, which is the resulting product of light L1 that is emitted from the light source, is transmitted through the polarizer 212, and is reflected downward through the half mirror 215, is aligned with the axial center AX of the rotary panel 261.

For example, the left and right side figures of FIG. 13 show that the optical center CX matches the axial center AX (since CX and AX cannot be distinguished from each other in the drawing if they are exactly match, CX is illustrated in a slightly shifted manner for distinguishment in the illustration), but the center figure shows that the two do not match each other. Note that the right figure of FIG. 13 shows the case where the light source 210 is disposed relatively high compared to the left figure.

In addition, the optical center is regarded as a center point of a light source having a certain size.

Figure 14:
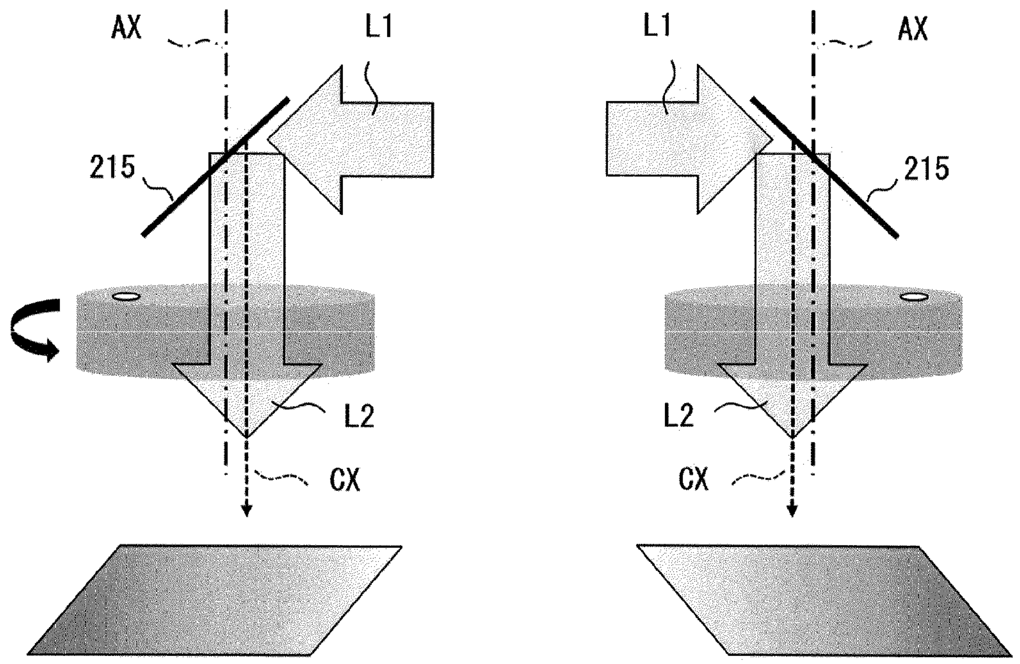
FIG. 14 is a diagram illustrating problems occurring in the case where the relative positions of the half mirror and the light source are inappropriate.

The reason for the determination shown in FIG. 13 is that, when CX and AX are deviated as shown in the center figure of FIG. 13, the density of light incident on the sample will fluctuate when the rotary panel 261 is rotated as shown in FIG. 14. For example, before rotation as illustrated on the left side of FIG. 14, the right side of the sample is brighter, while after the rotation as illustrated on the right side of FIG. 14, the left side of the sample is brighter. Therefore, it is difficult to observe the sample.

Here, a first optical path (optical axis) C1 of the polarizer 212 is horizontal, a second optical path (optical axis) C2 of the analyzer 222 is vertical, and C1 and C2 are not parallel and form a predetermined angle θ (θ=90° in FIG. 5).

The polarized light passing through the polarizer 212 and advancing in a lateral direction along the first optical path (optical axis) C1 is reflected by the half mirror 215 at an angle of 90°, and the light proceeds downward to irradiate the measurement sample $S_1$ or the reference sample $S_2$. Then, the light reflected from the measurement sample $S_1$ or the reference sample $S_2$ passes through the half mirror 215, proceeds upward along the second optical path (optical axis) C2, and enters the analyzer 222. The light is polarized by the analyzer 222 and is introduced into the camera 220.

On the other hand, when the rotary shaft 267 and the fixing member 260 are rotated via the pulley 242, the analyzer 222 can be polarized for each optical unit.

Figure 6:
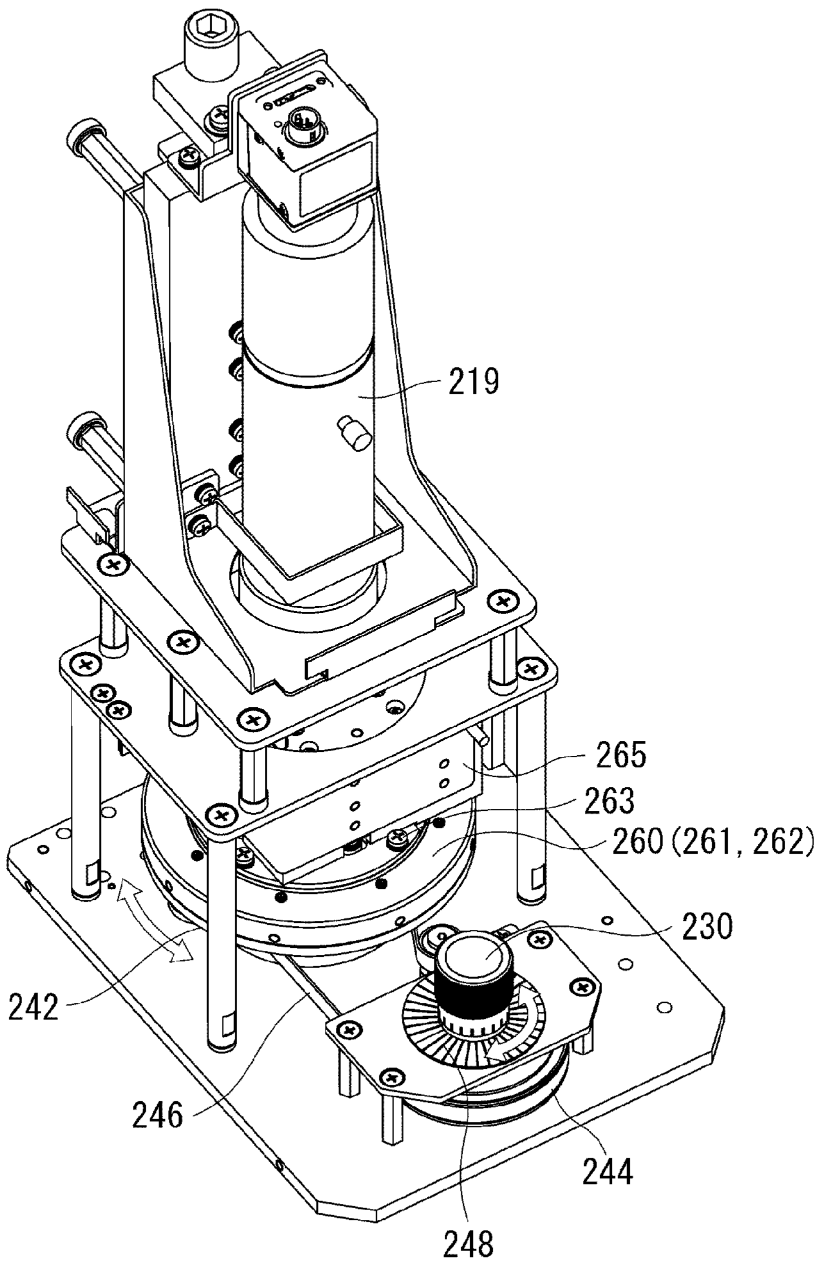
FIG. 6 is a top perspective view illustrating a fixing member and a rotation mechanism.

Specifically, as illustrated in FIG. 6, the pulley 242 and the pulley 244 are disposed on the upper surface of the attachment unit 202, and a belt 246 is stretched between the pulley 242 and the pulley 244.

The pulley 42 is attached to the underside (rotary shaft 262) of the fixing member 260 in the center of the attachment unit 202 and is supported by the rotary shaft 267 and the attachment unit 202. When the pulley 242 is rotated, the fixing member 260 is also rotated in tandem via the rotary shaft 267.

Note that FIG. 6 shows the state in which the covers 204 and 206 are removed.

The pulley 244 is directly connected to the turning knob 230 in front of the attachment unit 202. When a user turns the turning knob 230, the opposite pulley 242 moves in tandem with the pulley 244 via the belt 246.

In addition, the tuning knob 230 is appropriately marked with a reference position, and a doughnut-shaped angle plate 248 is mounted on the outer periphery of the turning knob 230. The rotation angle of the tuning knob 230 can be recognized by observing the positional relationship between the angle plate 248 and the reference position.

Note that the knob 230, the pulleys 242 and 244, and the belt 246 correspond to the "rotation mechanism" recited in the claims.

In addition, when the knob 230 is turned, the polarizer 212, the analyzer 222, the half mirror 215, and the light source 210 are rotated along with the rotation of the fixing member 260 via the pulley 242.

In this case, the optical axis of the analyzer 222 is arranged in alignment with the axial center AX of the fixing member 260. For this reason, the fixing member 260 is rotated in the polarization direction of the analyzer 222.

Note that the relative positions (optical units) of the polarizer 212, the analyzer 222, the half mirror 215, and the light source 210 do not change according to the rotation.

As described above, due to the mechanism in which the light passing through the polarizer is made to pass through the half mirror 215, since the first optical path (optical axis) C1 of the polarizer and the second optical path (optical axis) C2 of the analyzer are not parallel, in a state in which the polarization image acquisition apparatus including the polarizer 212 and the analyzer 222 is arranged outside the lid (window) 111 of the thermal analyzer, the inside of the lid (window) 1112 can be observed and imaged with the camera 220.

On the other hand, when the first optical path C1 and the second optical path are parallel, in a state in which the apparatus is disposed outside the lid (window) 111 of the thermal analyzer, the inside of the lid (window) 111 cannot be observed.

In addition, since the analyzer 222 can polarize the light with rotation of the fixing member 260, even though it is difficult in principle to rotate the samples (sample holders 41 and 42) in the thermal analyzer 100, the measurement sample $S_1$ or the reference sample $S_2$ in the thermal analyzer can be obtained through the lid (window) 111 by appropriately rotating the analyzer 222.

In addition, in the present invention, the reason of the configuration in which light polarization is made by rotating only the analyzer 222, and the relative positions of the polarizer 212, the half mirror 215, and the light source 210 are not changed (the relative positions are maintained on the fixing member 260) will be described.

Figure 7:
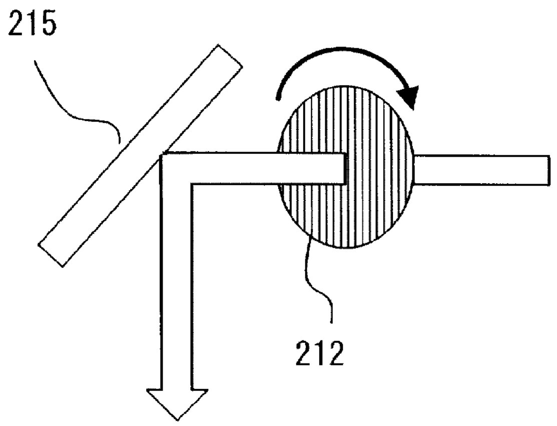
FIG. 7 is a schematic diagram illustrating a configuration when it is assumed that a polarizer is rotated to polarize incident light, and polarized light is introduced into a half mirror.

As shown in FIG. 7, it is assumed that the polarizer 212 is rotated to polarize (change the polarization direction) relative to the incident light, and that the polarized light is introduced into the half mirror (beam splitter) 215.

Figure 8:
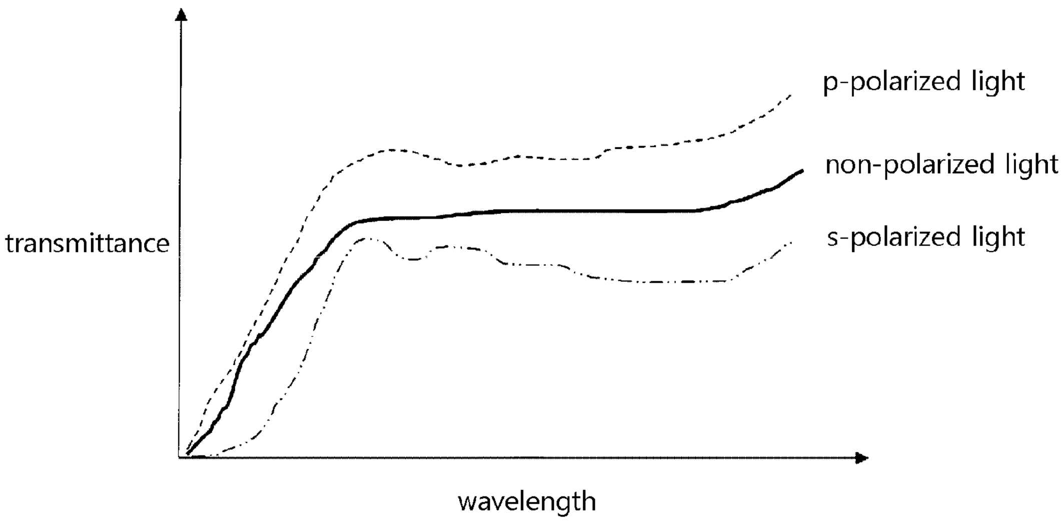
FIG. 8 is a schematic diagram illustrating changes in transmittance of the half mirror according to the polarization direction of light introduced into the half mirror.

In this case, as illustrated in FIG. 8, the transmittance of the half mirror 215 changes according to the polarization direction of the light introduced into the half mirror 215. In FIG. 8, the transmittance decreases in the case of s-polarized light and increases in the case of p-polarized light compared to non-polarized light.

In this manner, when the transmittance/reflectance fluctuates according to the polarization direction of the incident light, the amount of light in the polarization image obtained by the camera 220 for the measurement sample $S_1$ or the reference sample $S_2$ will fluctuate.

Accordingly, the relative positions of the polarizer 212 and the half mirror 215 can be maintained, thereby suppressing fluctuations in the light amount of the observation image.

Specifically, when the inventor measured the minimum and maximum values of the brightness of the light entering the camera 220 when the polarizer 212 was rotated, the minimum value was 14, and the maximum value 62, and the difference was 342%. On the other hand, when the minimum and maximum values of the brightness of the light entering the camera 220, with only the analyzer 222 rotated, were measured in the present invention apparatus of FIG. 4, the minimum value was 36, the maximum value was 41, and the difference was reduced to 14%.

Note that the brightness is represented in 0 to 255 tones.

In addition, in the present invention, the half mirror may be a cube-type beam splitter.

Figure 9:
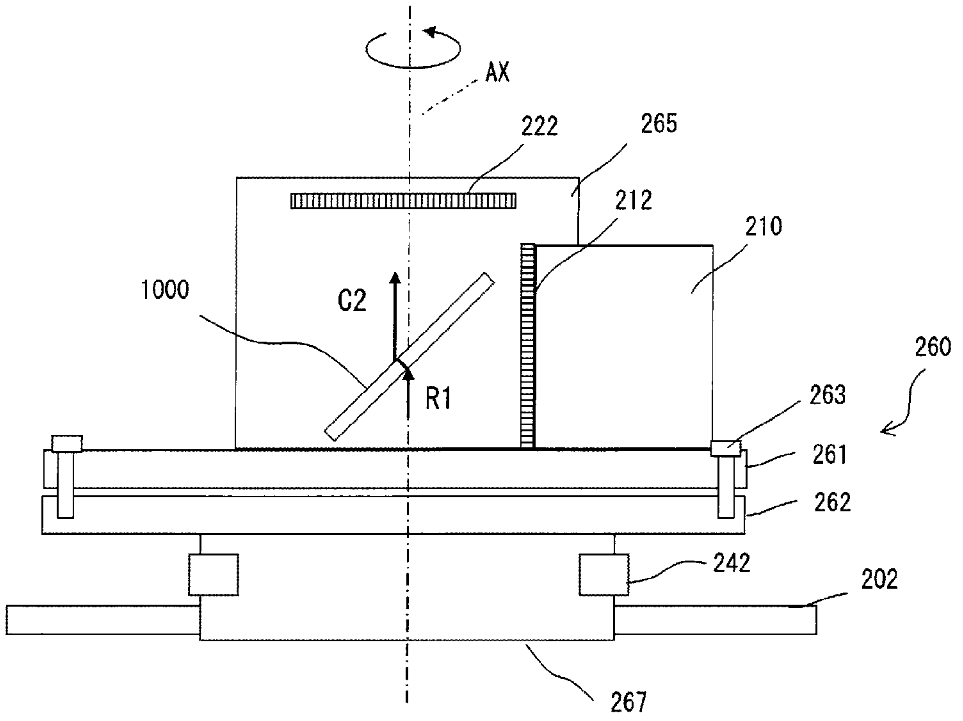
FIG. 9 is a schematic diagram illustrating optical path shifts caused by rotation of the fixing member when a plate-type beam splitter is used as the half mirror.

FIG. 9 is a schematic diagram illustrating shifts in an optical path caused by rotation of the fixing member 260 when a plate-type beam splitter is used as the half mirror 1000.

Because the plate-type beam splitter 1000 has a predetermined thickness, as shown in FIG. 9, the reflected light R1, which is the reflection of the incident light from the measurement sample $S_1$ or the reference sample $S_2$, is refracted within the plate-type beam splitter 1000, the optical path (position) of the transmitted light is shifted, and the light is incident on the camera 220 by traveling along the second optical path C2.

Figure 10:
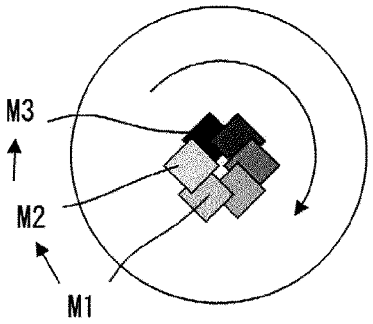
FIG. 10 is a schematic diagram illustrating a state in which an observation image moves eccentrically when the plate-type beam splitter is rotated for optical polarization.

Accordingly, as illustrated in FIG. 10, as the plate-type beam splitter rotates along with the rotation of the fixing member 260, an observation image M1 eccentrically moves with observation images M2, M3, . . . like a manner of drawing a circle, which obstructs observation.

On the other hand, a cube-type beam splitter is a structure composed of two prisms (usually right-angle prisms), in which an optical thin film is deposited on the sloped surface of one of the two prisms, and the two prisms are combined. For this reason, the thickness of the thin film acting as a beam splitter is extremely thin, thereby preventing refraction of transmitted light which occurs in the case of using the plate-type beam splitter, and the shift of the optical path (position) can be almost eliminated.

As a result, when the polarizer is rotated so that the light can be polarized, it is possible to inhibit the observation image from eccentrically moving, thereby facilitating observation.

In the present invention, the polarizer and the analyzer may be rotatable relative to each other.

According to the polarization image acquisition apparatus, the relative angle of the plane directions of the polarizer and the analyzer can be adjusted, and the degree of polarization effect can be adjusted.

Note that in the case where the analyzer 222 rotates along with the rotation of the fixing member 260, the polarization characteristics of the samples are scanned and adjusted. On the other hand, the rotation of only the analyzer 222 is used to observe the states of polarized light other than crossed Nicols by shifting the relative angle of the polarizer 212 and the analyzer 222 (adjusting the degree of polarization effect).

The present invention is not limited to the above-described embodiments, and various modifications and equivalents thereto fall within in the ideas and scope of the present invention.

The thermal analyzer is not particularly limited if it can measure thermal behaviors according to temperature changes when a measurement object is heated or cooled. Aside from the thermogravimetry (TG) device described above, the thermal analyzer may be any thermal analyzer defined in JIS K 0129:2005 standard "General Rules for Thermal Analysis". The thermal analyzer can be applied to all types of thermal analysis that measures the physical properties of a sample when the temperature of the measurement object (sample) is program-controlled. Specifically, exemplary thermal analysis methods include (1) differential thermal analysis (DTA) of detecting temperature (temperature difference), (2) differential scanning calorimetry (DSC) of detecting thermal flow difference, (3) thermogravimetry (TG) of detecting mass (weight change), and so on.

Figure 11:
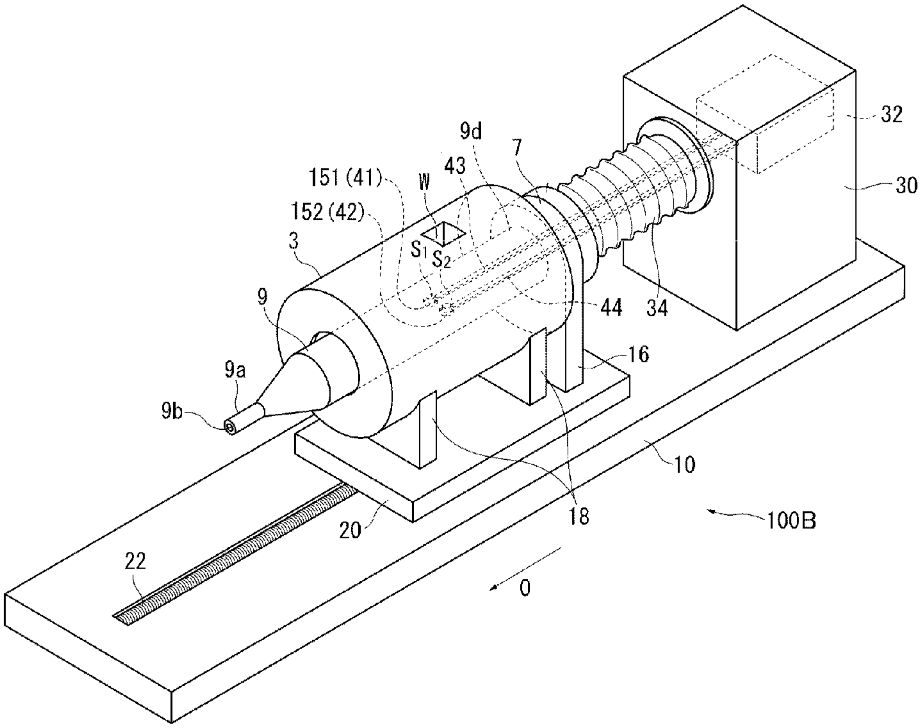
FIG. 11 is a cross-sectional view illustrating the construction of a thermogravimetry (TG) device, which is a thermal analyzer to which the polarization image acquisition apparatus according to one embodiment of the present invention is attached.
Figure 12:
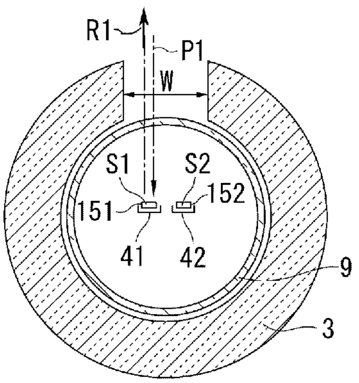
FIG. 12 is a cross-sectional view taken along the axial direction of the thermal analyzer of to FIG. 11.

For example, as illustrated in FIGS. 11 to 12, a thermal analyzer 100B may be a thermogravimetry (TG) device.

In addition, the leading end portion 9*a* side of a furnace tube 9 in an axial direction θ is referred to as "front end (side)", and the opposite end side is referred to as "rear end (side)". In addition, the thermal analyzer 100B of FIG. 11 corresponds to the thermal analyzers described in Patent Documents 2 and 3.

The thermal analyzer 100 constitutes a thermogravimetry (TG) device. The thermal analyzer includes a furnace tube 9 having a cylindrical shape and being made of a transparent material, a cylindrical heating furnace 3 surrounding the furnace tube 9 from the outside, a pair of sample holders 41 and 42 arranged in the furnace tube 9, a support stand 20, a measurement chamber connected to the rear end 9*d* of the axial direction θ of the furnace tube 9, a weight detector 32 arranged in the measurement chamber 30 and serving to measure the weight change of the samples $S_1$ and $S_2$, and a base 10 on which the measurement chamber 30 is mounted. Here, the measurement sample $S_1$ and the reference sample $S_2$ are respectively contained in sample containers 151 and 152, and the sample containers 151 and 152 are respectively mounted on the sample holders 41 and 42. In addition, the reference sample $S_2$ is a reference material (reference) for the measurement sample.

In addition, two struts 18 support the underside of the heating furnace 3, and each strut 18 is connected to the upper surface of the support stand 20. In addition, a flange portion 7 is fixed to the exterior of the rear end 9*d* of the furnace tube 9, the strut 16 supports the underside of the flange portion 7, and the strut 16 is connected to the upper surface of the support stand 20.

In addition, a linear actuator 22 is disposed in a groove formed along the axial direction O of the base 10, and the support stand 20 can be moved forward and backward in the axial direction O along the groove by the linear actuator 22.

The heating furnace 3 has a cylindrical core tube forming the inner surface of the heating furnace 3, a heater fitted around the core tube, and a cylindrical outer cylinder having side walls at respective ends. The heating furnace 3 is configured to heat the furnace tube 9 (and the samples 51 and $S_2$ inside the furnace tube 9) in a contactless manner.

In addition, the upper surface of the heating furnace 3 is provided with a substantially rectangular opening W extending from the outer cylinder to the core tube.

Here, the sample container 151 holding the measurement sample $S_1$ is an open bottomed cylinder that is closed at the bottom and is open at the top so that the measurement sample $S_1$ can be observed. On the other hand, since it is not necessary for the sample container 152 holding the reference sample S2 to be observable, a closed container may be used instead of the open bottomed container. However, it is preferable that the sample container 152 have the same shape as the sample container 151 in order for both the samples $S_1$ and $S_2$ to be heated in the furnace tube 9 under the same conditions.

Therefore, the samples $S_1$ and $S_2$ contained in the transparent furnace tube 9 can be observed via the opening W from the outside.

The diameter of the furnace tube 9 is reduced in a tapered shape toward the front end 9*a*. Since the front end 9*a* is formed in an elongated capillary shape with an exhaust port 9*b*, an appropriate purge gas can be introduced into the furnace tube 9 from the rear end side, and the purge gas, the decomposition product of the sample produced by the heating, and the like are discharged to the outside through the exhaust port 9*b*.

In addition, the transparent material forming the furnace tube 9 is a material that transmits visible light at a predetermined light transmittance, and a translucent material falls within the scope of the transparent material. In addition, as the transparent material, quartz glass, sapphire glass, or YAG (yttrium, aluminum, garnet) ceramics can be suitably used.

Balance arms 43 and 44 extending to the rear end in the axial direction O are connected to the sample holders 41 and 42, respectively. In addition, thermocouples are installed directly below the sample holders 41 and 42 so that the sample temperatures can be measured.

The measurement chamber 30 is disposed at the rear end of the furnace tube 9, and the measurement chamber 30 and the furnace tube 9 are configured to communicate each other via a tubular bellows 34.

A known weight detector 32 equipped with a coil, a magnet, and a position detector is disposed within the measurement chamber 30. The weights of the samples $S_1$ and $S_2$ at the tips of the balance aims 43 and 44 are then measured by measuring the currents that flow such that the balance arms 43 and 44 become level.

In the case where the samples $S_1$ and $S_2$ are set (placed) or replaced, the support stand 20 is moved forward to the front end side of the furnace tube 9, and the sample holders 41 and 42 are exposed at the rear end side by the furnace tube 9 and the heating furnace 3.

In addition, as illustrated in FIG. 12, the polarized light P1 passing through the polarizer 212 and advancing in a lateral direction along a first optical path (optical axis) C1 is reflected by the half mirror 215 at an angle of 90° and proceeds downward to irradiate the measurement sample $S_1$ or the reference sample $S_2$; and the reflected light R1 passes through the half mirror 215, proceeds upward along a second optical path (optical axis) C2, and enters the analyzer 222 as illustrated in FIG. 4.

Note that the polarization image acquisition apparatus 200 is omitted in the illustration of FIG. 12, and only an axial cross section of the polarization image acquisition apparatus 100*b* is illustrated.

What is claimed is:

1. A polarization image acquisition apparatus attached to a thermal analyzer, the thermal analyzer comprising a pair of sample containers containing a measurement sample and a reference sample, respectively, and a heating furnace surrounding the sample containers from outside, the heating furnace having a window or an opening through which at least the measurement sample is observable, the polarization image acquisition apparatus comprising:

an attachment unit attached to the thermal analyzer;

a light source;

a polarizer constituting a polarizing filter that polarizes irradiation light coming from the light source;

a camera;

a half mirror; and an analyzer constituting the polarizing filter configured such that the measurement sample or the reference sample is irradiated with polarized light transmitted through the polarizer through the window or opening via the half mirror, and light reflected from the measurement sample or the reference sample is polarized through the half mirror and is introduced into the camera, wherein the polarizer, the analyzer, the half mirror, and the light source are fixed to a fixing member, thereby constituting an optical unit, and the apparatus comprises a rotation mechanism configured to rotate the fixing member integrally with the polarizer, a half-mirror, and the light source about a rotating axis in a direction for polarizing the analyzer, while maintaining relative positions of the polarizer, the half-mirror, and the light source.

2. The polarization image acquisition apparatus according to claim 1, wherein the half mirror comprises a polarizing beam splitter cube.

3. The polarization image acquisition apparatus according to claim 1, wherein the fixing member comprises an adjustment member that adjusts at least an optical axis of the half mirror.

4. The polarization image acquisition apparatus according to claim 2, wherein the fixing member comprises an adjustment member that adjusts at least an optical axis of the half mirror.

5. The polarization image acquisition apparatus according to claim 1, wherein the polarizer and the analyzer are rotatable relative to each other.

6. The polarization image acquisition apparatus according to claim 2, wherein the polarizer and the analyzer are rotatable relative to each other.

7. A thermal analyzer comprising the polarization image acquisition apparatus of claim 1.

8. A thermal analyzer comprising the polarization image acquisition apparatus of claim 2.

* * * * *